May 5, 1953  G. A. TINNERMAN ET AL  2,637,230
TOOL FOR APPLYING SHEET METAL FASTENERS TO STUDS
Filed May 14, 1951  2 SHEETS—SHEET 1
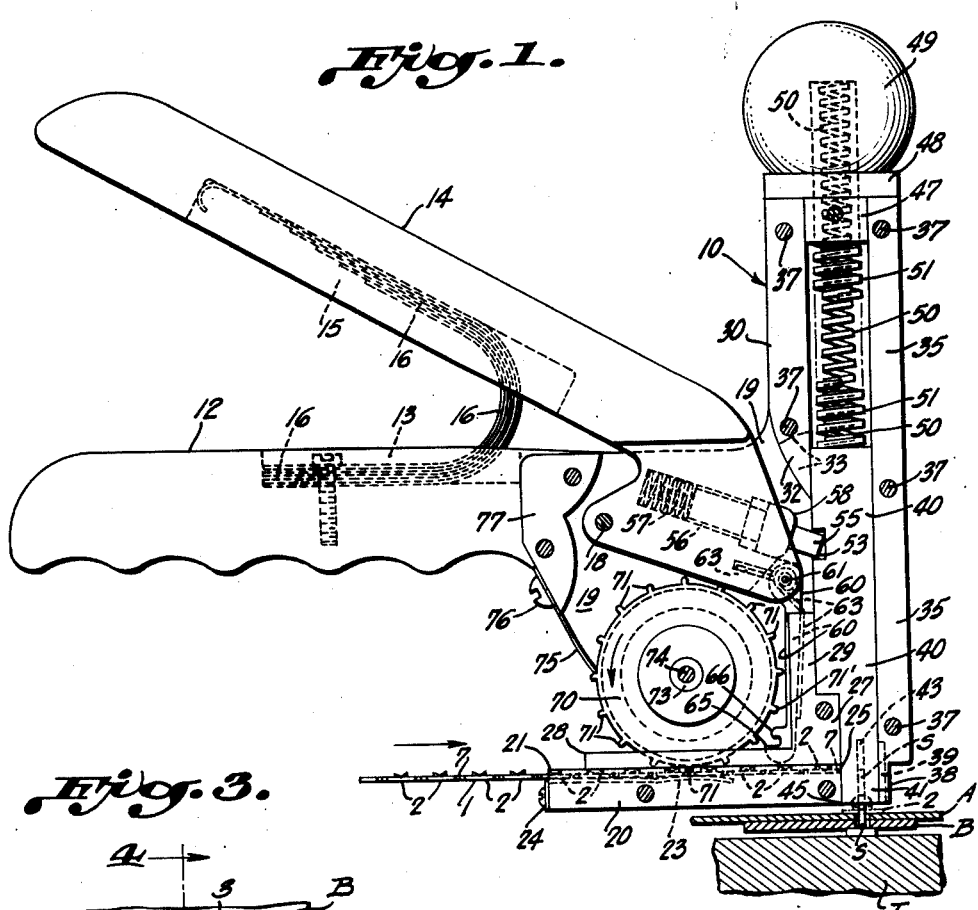
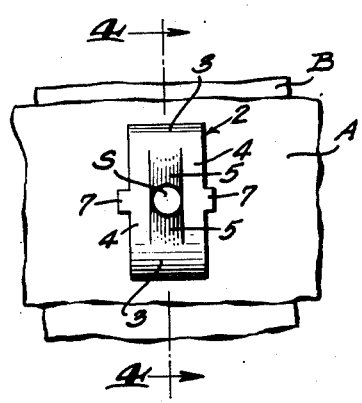
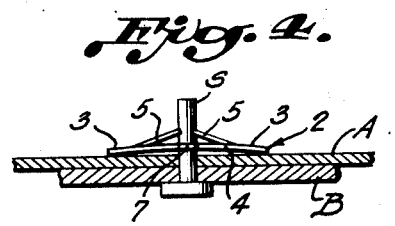
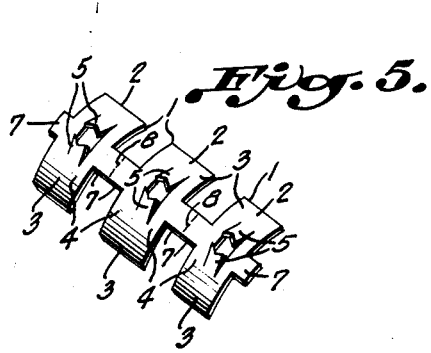
INVENTOR.
GEORGE A. TINNERMAN
LAURENCE H. FLORA
BY
H. G. Lombard
ATTORNEY

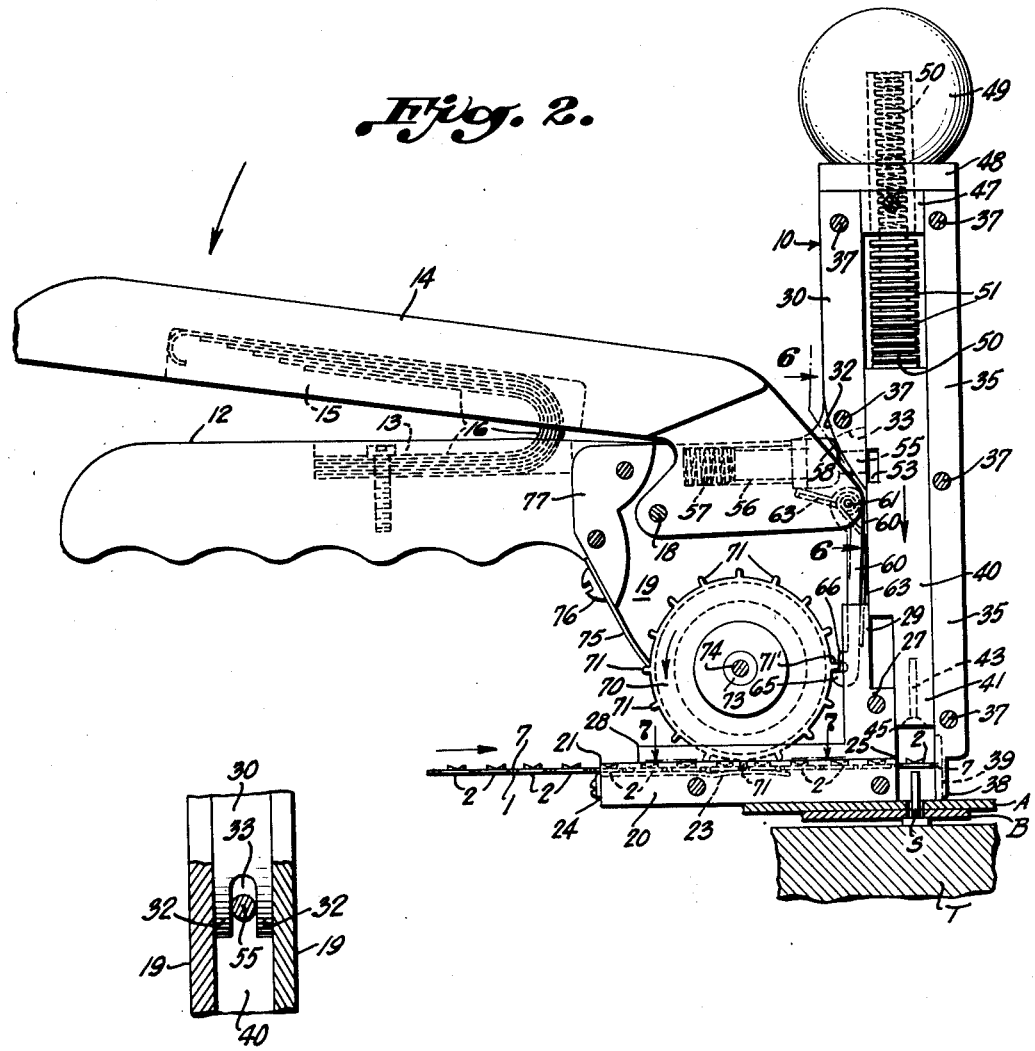

Patented May 5, 1953

2,637,230

UNITED STATES PATENT OFFICE 2,637,230

TOOL FOR APPLYING SHEET METAL FASTENERS TO STUDS

George A. Tinnerman and Laurence H. Flora, Cleveland, Ohio, assignors to Tinnerman Products, Inc., Cleveland, Ohio, a corporation of Ohio Application May 14, 1951, Serial No. 226,241

10 Claims. (Cl. 81—3)

This invention relates to improvements in tools for applying sheet metal or spring nut fastening devices to locked fastening position on a fastening stud of any nature such as the shank of a rivet, an integral connecting shank on a part to be secured, or a conventional bolt or screw.

The tool of the invention is employed to apply fasteners in the form of sheet metal or spring nut devices which are constructed of relatively thin sections of sheet metal such as heat treated, tempered spring steel from which stud engaging means are struck and formed to project upwardly out of the plane thereof when engaged with a stud or other shank under tension. The tool is readily adaptable to use for applying such fasteners in any form, particularly the kind having an upwardly arched or bowed base that is tensioned in fastening position to cause the stud engaging means to exert an axial drawing action on the stud which provides a tightened fastening assembly of the parts secured under constant spring tension. Due to the inherent resiliency of the metal and the manner in which the stud engaging means are provided, such spring fasteners are capable of quick, easy application to fastening position onto a bolt or stud by a substantially direct, axial thrust-like force which effects a sliding engagement of the said stud engaging means with the stud to the applied fastening position of the fastener in which the stud engaging means are disposed in locked embedded engagement with the stud, and the tensioned base of the fastener exerts a continuously effective axial drawing action on the stud to ensure a locked tightened installation of the parts secured, as aforesaid.

Inasmuch as these spring nuts and similar fasteners are often small and difficult to manipulate in applying the same to fastening position on the studs, the handling of the fasteners is greatly facilitated when they are prepared in strip form and secured by the tool of the present invention which is designed for automatically applying the individual fasteners in any member and otherwise automatically feeding the fasteners successively into position for application by the tool in a minimum of time and effort on the part of the operator, thereby greatly reducing the cost, time and labor involved in many types of assemblies produced by mass production methods.

A primary object of the invention is to provide an improved tool for applying such fasteners as prepared in strip form in an arrangement whereby the tool automatically performs, in a single actuation, the several operations of feeding the strip forward to locate a fastener in position to be severed from the strip, severing a fastener from the strip, and automatically applying the severed fastener to fastening position on the stud or shank.

Another object of the invention is to provide a tool of the kind described comprising a simple operating lever which in a single actuation provides and sets up the force for effecting all the foregoing described operations of feeding the strip forward to locate a fastener in position to be severed, severing a fastener from the strip, and applying the severed fastener to the stud in an assembly to be secured.

A further object of the invention is to provide a tool of this character in which the feeding means comprises a feed wheel that engages the strip of fasteners to advance the same, and which feeding means is operated by the same operating lever that actuates the mechanism for severing a fastener from the strip and applying the severed fastener to fastening position in an assembly.

An additional object of the invention is to produce a tool, as aforesaid, wherein a hand operated lever mechanism is employed to actuate the tool and is so incorporated in the tool as to provide a lightweight, compact device that is fool-proof and easily and quickly handled and operated with much greater speed and economy than heretofore known tools or devices of this character.

Another object of the invention is to provide a tool embodying the foregoing features of construction and which is especially designed to receive spring nut fasteners of the kind described as prepared in strip form and in a manner in which the fasteners are not subject to undue bending forces and strains in the handling, feeding and application thereof. The arrangement is such that when the fasteners used are of the type which have the advantageous generally arched or bowed base construction, such fasteners are prepared in strip form with the arched bases extending transversely of the strip and joined at their sides by connecting web portions which are severed to cut each fastener from the strip without in any way distorting or deforming the fasteners from their original arched configuration as designed for most effective application to the stud or other shank, as aforesaid.

Further objects and advantages, and other new and useful features in the construction, arrangement and general combination of parts of the invention will be readily apparent as the following description proceeds with reference to the accompanying drawings, for purposes of illustration, but not of limitation, in which like reference characters designate like parts throughout, and in which:

Fig. 1 is a vertical sectional view through the body of the tool in accordance with the invention, showing the same in position for applying a fastener to a stud in an assembly of parts to be secured;

Fig. 2 is a similar sectional view through the body of the tool showing the ram or plunger therein as actuated to the end of its upward stroke and in position for severing a fastener from the strip and applying the severed fastener to fastening position on the stud;

Fig. 3 is a top plan view of the assembly of parts secured showing the spring nut fastener in applied fastening position on the stud or other shank;

Fig. 4 is a sectional view of the parts secured, as along line 4—4 of Fig. 3, showing the spring nut fastener in edge elevation in applied fastening position on the stud or other shank;

Fig. 5 is a perspective view illustrating the fasteners used with the tool of the invention as prepared in strip form;

Fig. 6 is a sectional view along line 6—6 of Fig. 2 showing the cam surface included in the means for releasing the ram or plunger of the tool at the beginning of its stroke for severing and applying a fastener to fastening position; and, Fig. 7 is a sectional view along line 7—7 of Fig. 2 showing a fragment of the fastener strip in top plan as positioned in the tool and illustrates the arrangement for advancing the fastener strip by the feeding mechanism of the tool.

The sheet metal or spring nut devices which are applied by the tool of the present invention are constructed from relatively thin sections of any suitable sheet metal, preferably spring metal or cold rolled metal having spring characteristics. As shown in Figs. 3 and 4, such a sheet metal or spring nut fastener is employed to secure a fastening assembly of any two or more parts A, B, by means of a stud or shank S. The stud S is provided in any desired manner as by an integral stud on one of said parts extending through an opening in the other, or by the shank of a rivet, bolt or screw passing through aligned openings in said parts and having the head thereof suitably bolstered for the fastening operation as by a work table T, Fig. 1. By way of example, one type of such a fastener as prepared in the form of a strip 1 is shown in Figs. 5 and 7, with each fastener 2 comprising a generally rectangular section defined by end portions 3 and bridge or side portions 4 between which integral yieldable stud engaging means such as tongues 5, for example, are formed to extend upwardly for engaging a stud or other shank under tension. The said end and bridge portions 3, 4, provide what may be termed, the body of the fastener, which body is so formed in the stamping operation as to present a normally untensioned, generally arched or concave base. When such a fastener is applied to the shank of the stud or bolt, the yieldable stud engaging elements 5 readily slide along the shank to the point at which the fastener base contacts the adjacent work surface or part secured; at such point, the end portions 3 are moved from their initial, normally untensioned position in the generally concave base outwardly and upwardly in a substantial lifting force which is transmitted to the tongues 5 to urge the extremities thereof inwardly toward each other such that said tongues are caused to dig into and become embedded in the shank and resist any tendency toward reverse movement or loosening. At the same time, the bowed side portions 4 are elongated such that the generally concave base assumes the position of a substantially flat or slightly arched plate in anchored relation with the stud or shank. The bending moment which serves to anchor the spring nut device onto the stud or bolt is produced by the tensioned side and end portions which are flattened against the adjacent surface of the work, and which, in attempting to resume their initial, normally untensioned configuration in the generally concave base, assume only a slightly bowed or arched formation and thereby urge the tongues or stud engaging elements 5 inwardly toward each other to locking engagement with the stud and simultaneously exert an axial drawing action on the stud to provide a tightened fastening assembly of the parts secured under constant spring tension.

As shown in Figs. 5 and 7, the spring nuts 2 are prepared in the form of a strip 1 with their generally arched or bowed bases extending transversely of the strip and with the sides of the adjacent fasteners joined by connecting webs 7 which are severed along the dotted lines 8 by the instant tool to separate the individual fasteners from the strip just prior to the application of a severed fastener to secure an assembly of parts, as aforesaid. The provision of the fasteners 2 with their arched bases extending transversely of the strip is most important from the standpoint of manufacture of the strip inasmuch as the fasteners may thus be stamped and formed in an arched or bowed base formation with the ends of each fastener extending free in the normal untensioned configuration of the fastener and without distortion or deformation of any nature for application to fastening position on a stud or shank in the most effective manner, as presently to be described.

The tool, designated generally 10, is provided in the general form shown in Figs. 1 and 2 to comprise a handle composed of a fixed handle member 12 and a pivoted handle member 14 for operating the actuating mechanism of the tool. The handle member 14 is maintained in normally raised relation to the fixed handle 12 by a multiple leaf spring 16 which is bent back upon itself to tension the same and has one end bolted in a recess 13 in the fixed handle 12 and its other end seated in a longitudinal recess 15 in the pivoted handle member 14.

The fixed handle member 12 is secured to a suitable casing comprising a plate 19 at each side of the tool and the pivoted handle member 14 is mounted within said casing on a transverse pivot pin 18 in operative relation to said fixed handle member 12. It will be understood that the tool casing 19 may be of any suitable character to cover all or any portion of the actuating mechanism of the tool and, in the present example, the tool is shown more or less stripped of such casing for convenience of illustration.

The base of the tool comprises a lower base block 20 which is grooved on its upper surface to provide a channel or chute defined by spaced ribs 21 which guide the strip of fasteners 1, Figs. 5 and 7, as said strip is advanced to the severing means at the forward end of the tool. Preferably a leaf spring 23 is seated in said guide channel in the base block 20 under the strip of fasteners 1 to maintain the strip of fasteners in positive engagement with the overlying feed wheel. The leaf spring 23 is retained in said guide channel of the base block 20 in any suitable manner, as by means of an extension 24 bolted to the end of said base block. The forward end of the base block 20 defines a shearing edge 25 for the strip of fasteners 2 and above said base block there are provided upper guide strips 27 having spaced horizontal side flanges 28 which overlie the guide ribs 21 on the base block in aligned relation therewith. The horizontal flanges 28 aid in the guiding of the strip of fasteners 2 and maintain the same in proper relation to the feed wheel of the tool; the adjoining spaced vertical flanges 29 of said upper guide strips 27 serve to guide the associated lever and pawl mechanism for actuating said feed wheel as presently to be described.

Between the side plates 19 forming the casing for the tool, there is provided in the upper portion of said tool, a vertical spacer block 30, Fig. 6, having an inwardly curved cam surface 32 on its lower end which is provided with a slot 33, Fig. 6, for passing a trip pin in the actuation of the tool. A similar full-length vertical spacer block 35 in spaced relation to the block 30 defines the forward end face of the tool. These vertical spacer blocks 30, 35, provide solid supports for securing thereto the side plates 19 of the tool as by screws 37. The lower end of said vertical block 35 is cut away to form a narrow foot 38 which provides for suitable visibility of the work as the tool is positioned thereon for a fastener applying operation, and the inner surface of said foot 38 is provided with a longitudinal groove 39 for accommodating the projecting web portion 7 of the leading fastener 2 on the strip, as shown in Fig. 2, when advanced into position to be severed and applied by the tool.

The space between the vertical spacer blocks 30 and 35 defines a slideway for a reciprocable ram or plunger 40 which has a rectangular head 41 on its lower end approximating the size of the base portions of the fasteners 2 in the strip 1. The tool head 41 has a stud receiving bore 43 formed with an outwardly flared entrance which provides for an easy, quick application of said bore 43 over the projecting end portion of the stud S in an assembly of parts to be secured. The tool head 41 otherwise is provided with side clamping portions and end clamping portions for fitting onto and engaging the side portions 4 and end portions 3, respectively, of a fastener 2. The most effective locking action of the spring nut fastening devices 2 in a tight, rigid assembly is obtained when the generally arched or concave bases thereof are flattened without any substantial pressure being exerted on the stud engaging elements or tongues 5. Any substantial pressure on the stud engaging elements 5 prevents the same from having smooth, sliding engagement with the shank of the bolt or stud S on being applied, and also deforms the same with respect to the generally concave fastener base such that the extremities of the tongues 5 are not in most effective contact with the shank, whereupon the tongues have a tendency to slip in a tightened assembly thereby resulting in a loose, faulty installation.

In the use of the tool of the instant invention, a tight installation is ensured and any such tendency of the tongues or stud engaging elements 5 to slip or loosen from applied fastening position is eliminated inasmuch as the tool head 41 is designed for advancing a fastener to locked fastening engagement on a stud S by pressure applied directly to the side portions 4 and end portions 3 to flatten the generally concave base without engaging the stud engaging means 5, and thus, when the tool is withdrawn and the attendant pressure removed from the flattened side portions 4, the tension stored therein causes the tongues 5 to become embedded in the stud in the most effective manner. Preferably, the side clamping portions of the tool head 41 are slightly arched so as to engage the arched side portions 4 of a fastener in a manner which ensures a slight arch in the fastener base in fully applied fastening position. The rearward side edge 45 or heel of said tool head 41 otherwise serves as a sharp cutter edge which cooperates with the shearing edge 25 on the base block 20 to sever a fastener from the strip when the ram or plunger 40 is actuated.

The slideway for the ram 40, thus provided, is in the nature of a vertical post and at the upper end of said slideway there is provided a spacer block 47 having a cap piece 48 carrying a ball-type hand grip 49 all having a common bore receiving the upper end of a coil spring 50 bearing on the upper end of the ram 40. Preferably a second, larger coil spring 51 is telescoped over the smaller coil spring 50 in abutting relation to the block 47 and bears upon the upper end of the ram 40 in cooperation with said smaller coil spring 50, thereby providing a high powered spring action on the ram or plunger 40 to actuate the same in a fastener applying operation.

The ram or plunger 40 is provided with a recess 53 on its inner side which receives a removable spring pressed trip pin 55 yieldably mounted on the pivoted handle member 14 to serve as a releasable coupling means between said ram 40 and said handle or lever member 14. In a preferred construction, the handle member 14 is provided with a blind bore 56 and a spring 57 seated in said bore bearing yieldably on the rearward end of said pin 55 to maintain the same in the normally projecting relation shown in Fig. 1. The trip pin 55 is provided with a cam collar 58 adjacent its forward end adapted to engage the cam surface 32 on the spacer block 30, as seen in Fig. 2, in which relation the projecting end of said trip pin 55 passes into the slot 33 in said cam surface 32 as shown in Fig. 6. The arrangement is such that the trip pin 55 is retained in assembled relation in the bore 56 in the handle 14 by the seating of the projecting end of said pin 55 in the recess 53 in the ram 40 in initial position, as seen in Fig. 1, and thereafter, in the position shown in Fig. 2, by the engagement of the cam collar 58 with the cam surface 32 and the reception of said trip pin 55 in the slot 33 in said cam surface 32, as illustrated in Fig. 6.

The lower forward end of the pivoted handle member 14 is suitably slotted for connection to the upper end of a pivoted lever 60 secured thereto by a transverse pin 61. A spring 63, looped around said transverse pin 61, has one end in fixed abutting relation to the handle member 14 and its other end bearing on the inner face of said lever 60 to maintain the same normally in inwardly urged relation to the feed wheel 70. The lower end of said lever 60 terminates in a hook-like pawl 65 adapted to engage the teeth 71 on the periphery of said feed wheel 70 to move said wheel in a counterclockwise direction when said pawl 65 is actuated from the position shown in Fig. 1 to that of Fig. 2 in each operation of the tool. Preferably a cooperating detent 66 is provided on the lever 60 in spaced relation to the pawl 65 so that said pawl 65 and detent 66 serve in the manner of spaced shoulders retaining therebetween the engaged pair of teeth 71 on the feed wheel 70 during the major portion of a feeding movement of said wheel, thereby preventing accidental overrun of said feed wheel.

The feed wheel 70 is provided with hub portions 73 on each side for mounting the same rotatably on a transverse shaft 74 in operative relation to the strip of fasteners 2. The teeth 71 are provided in pairs on said feed wheel 70 for operation in the manner of pairs of dogs which fall into the spaces between adjacent fasteners 2, as seen in Fig. 7, and abut the adjacent side edge of any fastener 2 engaged thereby to advance the strip of fasteners in the tool when the feed wheel is actuated by the pawl 65, as aforesaid.

A suitable brake or stop device is provided to hold the feed wheel 70 against backward turning after any feeding operation thereof so as to prevent removal or shifting of the strip of fasteners from proper position in the tool. In the present example, such a stop device is shown provided by a leaf spring 75 which is attached at one end by a screw 76 to a supporting block 77 forming a part of the fixed handle 12 of the tool. The other free end of said spring 75 is of such width as to extend across the feed wheel 70 and snap over any of the pairs of teeth 71 during the counterclockwise feeding movement of said feed wheel, and, at the end of any such feeding movement, to engage behind the adjacent pair of said teeth 71 to hold said feed wheel 70 against backward clockwise turning, whereupon the feed wheel, in such locked position, retains the strip of fasteners in properly loaded relation in the tool and prevents any shifting of the same from the proper position for an accurate fastening applying operation.

From the foregoing, it will be understood that in the operation and use of the tool for applying fasteners in accordance with the invention, the tool is loaded with a strip of fasteners 2 substantially as shown in Fig. 1. The fasteners may be provided in any selected length of strip 1 or in a considerable quantity provided by a similar strip in a roll mounted on a reel, for example. In any event, when the leading end of a strip 1 is loaded into the tool, the fasteners 2 slide within the guide channel in the base block 20 to a position in which the foremost fastener 2 engages the adjacent side surface of the tool head 41 on the ram or plunger 40. The arrangement is such that the strip of fasteners passes under the feed wheel 70 with the pairs of teeth 71 on said feed wheel received in the spaces between adjoining fasteners 2, as shown in Fig. 7. The leaf spring 23 urges the strip of fasteners upwardly to retain the same positively in such engaged relation with the feed wheel 70, and said feed wheel otherwise turns in a counterclockwise direction, as indicated by the arrow in Fig. 1, until the leading fastener 2 engages the side surface of the tool head 41, as aforesaid.

With the tool thus loaded with a strip of fasteners, the tool is brought into position over an assembly of parts A, B, to be secured, and the bore 43 in the tool head 41 easily and quickly slipped over the projecting stud portion S in said assembly as shown in Fig. 1. The tool is easily and quickly applied to an assembly in this manner inasmuch as the stud receiving bore 43 has a flared entrance for this purpose which readily receives the projecting stud portion S. The parts of the tool in this relation are in initial position ready to be actuated for a fastener applying operation and, in this regard, the projecting end of trip pin 55 is received in the recess 53 in the plunger or ram 40. The trip pin 55 is carried by said pivoted handle member 14, and accordingly, when the tool is actuated by the operator to move said pivoted handle member 14 toward the fixed handle 12, as shown in Fig. 2, the plunger is raised upwardly by the trip pin 55, against the force of the coil springs 50, 51, to the limit of upward movement of the plunger 40, substantially as shown in Fig. 2.

At the limit of such upward movement of the plunger 40, the cam collar 58 on the trip pin 55 engages the cam surface 32 on the spacer block 30, with the projecting end of said trip pin 55 received in the slot 33 in said cam surface 32, as shown in Fig. 6. The engagement of the cam collar 58 with the cam surface 32 forces said cam collar 58 inwardly such that the trip pin 55 is withdrawn from the recess 53 in the plunger 40. The raised plunger 40 is thereupon free to descend with great force under the influence of the compressed coil springs 50, 51, to sever a fastener from the strip and simultaneously push the severed fastener to applied fastening position on the projecting stud S of the assembly of parts to be secured.

During the same aforesaid actuation of the pivoted handle member 14 toward the fixed handle 12, the lever 60 carried by said handle member 14, moves upwardly adjacent the feed wheel 70 from the position shown in Fig. 1 in a manner whereby the pawl 65 on said lever engages the pair of teeth 71' on said feed wheel which lie in the path of said pawl 65. The pawl 65 thus turns the feed wheel counterclockwise in the direction of the arrow to advance the strip of fasteners a distance approximating the width of the leading fastener 2. The arrangement is such that the leading fastener 2 passes under the previously raised plunger 40 to the position shown in Fig. 2, where the forward edge of said leading fastener engages the inner surface of the narrow foot 38 with the projecting web portion 7 of the fastener received in the longitudinal groove 39 in said foot.

The leading fastener 2, as thus fed forwardly under the plunger 40, is in proper position to be severed from the strip of fasteners by said plunger 40 and simultaneously applied to fastening position on the stud S. This takes place upon downward movement of the plunger 40 from its raised position following the aforesaid feeding operation and upon engagement of the cam collar 58 with the cam surface 32 which, as stated, disengages said trip pin 55 from the raised plunger 40 and thereby permits said plunger 40 to descend under the expansive force of the compressed coil springs 50, 51.

On the downward movement of the plunger 40, the cutting edge 45 on the tool head 41 cooperates with the shearing edge 25 of the base block 20 to sever the leading fastener 2 from the strip by cutting the adjacent connecting web 7 along the dotted line 8, Fig. 5. The tool head 41 simultaneously pushes the severed fastener 2 onto the projecting end of the stud S and forces the same to applied fastening position, substantially as illustrated in dotted lines in Fig. 1, whereby the parts of the assembly are secured as shown in Figs. 3 and 4.

At the end of such a fastener applying operation, the parts of the tool are in their initial position shown in Fig. 1, whereupon the tool is ready to be positioned to apply a succeeding fastener to the stud of another assembly in a repetition of the foregoing described procedure.

While the tool of the invention has been described in detail with a specific example, such example is intended as an illustration only inasmuch as it will be apparent that various modifications in the construction, arrangement, and general combination of parts may be provided without departing from the spirit and scope of the invention.

What is claimed is:

1. A tool for applying fasteners comprising a supporting structure having a guide channel therein for a strip of fasteners to be applied, an operating lever and a reciprocable ram movably mounted in said supporting structure, said ram being normally in lowered position, coupling means between said lever and ram whereby movement of said lever actuates said ram to raised position, a feed wheel adjacent said guide channel for advancing said strip to locate a fastener under said raised ram in position to be applied by said ram, means connected to said lever and engaging said feed wheel for actuating said feed wheel at the same time said lever operates to raise said ram, and means adjacent said ram engageable with said coupling means for releasing said lever from coupled relation with said ram in raised position to permit said ram to descend for a fastener applying operation.

2. A tool for applying fasteners comprising a supporting structure having a guide channel therein for the fasteners to be applied, an operating lever and a reciprocable ram movably mounted in said supporting structure, said ram being normally in lowered position, coupling means between said lever and ram whereby movement of said lever actuates said ram to raised position, a feed wheel adjacent said guide channel for advancing a fastener under said raised ram in position to be applied by said ram, a pawl connected to said lever and engaging said feed wheel for actuating said feed wheel at the same time said lever operates to raise said ram, and a cam adjacent said ram engageable with said coupling means for releasing said lever from coupled relation with said ram in raised position to permit said ram to descend for a fastener applying operation.

3. A tool for applying a spring nut fastener to fastening position on a projecting stud in an assembly of parts to be secured, said tool comprising a supporting structure, a guide channel therein for a strip of said fasteners, an operating lever and a reciprocable ram movably mounted in said supporting structure, said ram being normally in lowered position and having a head provided with a bore for fitting onto said projecting stud in said lowered position, coupling means between said lever and ram whereby movement of said lever actuates said ram to raised position, a feed wheel adjacent said guide channel for advancing said strip to locate a fastener under said raised ram in position to be applied by said ram, means connected to said lever and engaging said feed wheel for actuating said feed wheel at the same time said lever operates to raise said ram, and means adjacent said ram engageable with said coupling means for releasing said lever from coupled relation with said ram in raised position to permit said ram to descend for a fastener applying operation.

4. A tool for applying a spring nut fastener to fastening position on a projecting stud in an assembly of parts to be secured, said tool comprising a supporting structure, a guide channel therein for a strip of said fasteners, an operating lever and a reciprocable ram movably mounted in said supporting structure, said ram being normally in lowered position and having a head provided with a bore for fitting onto said projecting stud in said lowered position, said ram having a recess, a pin carried by said lever and removably received in said recess in the ram, said lever and pin operating to move said ram to raised position, a feed wheel adjacent said guide channel for advancing said strip to locate a fastener under said raised ram in position to be applied by said ram, means connected to said lever and engaging said feed wheel for actuating said feed wheel at the same time said lever operates to raise said ram, and means adjacent said ram engageable with said pin to remove said pin from the recess in said ram in raised position to permit said ram to descend for a fastener applying operation.

5. A tool for applying a spring nut fastener to fastening position on a projecting stud in an assembly of parts to be secured, said tool comprising a supporting structure, a guide channel therein for a strip of said fasteners, an operating lever and a reciprocable ram movably mounted in said supporting structure, said ram being normally in lowered position and having a head provided with a bore for fitting onto said projecting stud in said lowered position, said ram having a recess, a trip pin carried by said lever and removably received in said recess in the ram, said lever and trip pin operating to move said ram to raised position, a feed wheel adjacent said guide channel for advancing said strip to locate a fastener under said raised ram in position to be applied by said ram, means connected to said lever and engaging said feed wheel for actuating said feed wheel at the same time said lever operates to raise said ram, and a cam adjacent said ram engageable with said trip pin for removing said trip pin from the recess in said ram in raised position to permit said ram to descend for a fastener applying operation.

6. A tool for applying a spring nut fastener to fastening position on a projecting stud in an assembly of parts to be secured, said tool comprising a supporting structure, a guide channel therein for a strip of fasteners to be applied, an operating lever having a handle and a reciprocable ram movably mounted in said supporting structure, said ram being normally in lowered position and having a head provided with a bore for fitting onto said projecting stud in said lowered position, coupling means between said lever and ram whereby movement of said lever actuates said ram to raised position, a feed wheel adjacent said guide channel for advancing said strip to locate a fastener under said raised ram in position to be applied by said ram, a member carried by said lever and movable in a substantially opposite direction from the movement of said handle of the lever into engagement with said feed wheel for actuating said feed wheel at the same time said lever is operated by said handle to raise said ram, and means adjacent said ram engageable with said coupling means for releasing said lever from said ram in raised position to permit said ram to descend for a fastener applying operation.

7. A tool for applying a spring nut fastener to fastening position on a projecting stud in an assembly of parts to be secured, said tool comprising a supporting structure, a guide channel therein for a strip of said fasteners, an operating lever having a handle and a reciprocable ram movably mounted in said supporting structure, said ram being normally in lowered position and having a head provided with a bore for fitting into said projecting stud in said lowered position, said ram having a recess, a pin carried by said lever and removably received in said recess in the ram, said lever and pin operating to move said ram to raised position, a feed wheel adjacent said guide channel for advancing said strip to locate a fastener under said raised ram in position to be applied by said ram, a member connected to said lever and movable in a substantially opposite direction from the movement of said handle of the lever into engagement with said feed wheel for actuating said feed wheel at the same time said lever is operated by said handle to raise said ram, and means adjacent said ram and engageable with said pin for removing said pin from the recess in said ram in raised position to permit said ram to descend for a fastener applying operation.

8. A tool for applying a spring nut fastener to fastening position on a projecting stud in an assembly of parts to be secured, said tool comprising a supporting structure, a guide channel therein for a strip of said fasteners, an operating lever having a handle and a reciprocable ram movably mounted in said supporting structure, said ram being normally in lowered position and having a head provided with a bore for fitting onto said projecting stud in said lowered position, said ram having a recess, a trip pin carried by said lever and removably received in said recess in the ram, said lever and trip pin operating to move said ram to raised position, a feed wheel adjacent said guide channel for advancing said strip to locate a fastener under said raised ram in position to be applied by said ram, a member connected to said lever comprising a pawl movable in a substantially opposite direction from the movement of said handle of the lever into engagement with said feed wheel for actuating said feed wheel at the same time said lever is operated by said handle to raise said ram, and means adjacent said ram and engageable with said trip pin for removing said trip pin from the recess in said ram in raised position to permit said ram to descend for a fastener applying operation.

9. A tool for applying a spring nut fastener to fastening position on a projecting stud in an assembly of parts to be secured, said tool comprising a supporting structure, a guide channel therein for a strip of said fasteners, an operating lever having a handle and a reciprocable ram movably mounted in said supporting structure, said ram being normally in lowered position and having a head provided with a bore for fitting onto said projecting stud in said lowered position, said ram having a recess, a trip pin carried by said lever and removably received in said recess in the ram, said lever and trip pin operating to move said ram to raised position, a feed wheel adjacent said guide channel having teeth on its periphery for advancing said strip to locate a fastener under said raised ram in position to be applied by said ram, a member connected to said lever comprising a pawl movable in a substantially opposite direction from the movement of said handle of the lever into engagement with said teeth on said feed wheel for actuating said feed wheel at the same time said lever is operated by said handle to raise said ram, and means comprising a cam surface adjacent said ram and engageable with said trip pin for removing said trip pin from the recess in said ram in raised position to permit said ram to descend for a fastener applying operation.

10. A tool casing comprising a base and side plates, a guide channel in said base, a handle rigidly attached to said side plates, a ram movable angularly relative to said base, said ram being normally in lowered position and having a recess, a lever movably connected to said handle, a trip pin carried by said lever and removably received in said recess in the ram, said lever and trip pin operating to move said ram to raised position, a feed wheel adjacent said guide channel, means connected to said lever and engaging said feed wheel for actuating said feed wheel at the same time said lever operates to raise said ram, and a cam adjacent said ram engageable with said trip pin for removing said trip pin from the recess in said ram in raised position to permit said ram to descend for a fastener applying operation.

GEORGE A. TINNERMAN.
LAURENCE H. FLORA.

References Cited in the file of this patent

UNITED STATES PATENTS

| Number | Name | Date |
|---|---|---|
| 1,067,541 | Palmgren | July 15, 1913 |
| 1,805,791 | Treat | May 19, 1931 |
| 2,315,209 | Kost | Mar. 30, 1943 |
| 2,425,494 | Taylor | Aug. 12, 1947 |
| 2,470,891 | Hammers | May 24, 1949 |